United States Patent
Logunov et al.

(10) Patent No.: US 11,964,898 B2
(45) Date of Patent: Apr. 23, 2024

(54) LASER-INDUCED SEPARATION OF TRANSPARENT OXIDE GLASS

(71) Applicant: Corning Incorporated, Corning, NY (US)

(72) Inventors: Stephan Lvovich Logunov, Corning, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 804 days.

(21) Appl. No.: 17/053,524

(22) PCT Filed: May 7, 2019

(86) PCT No.: PCT/US2019/031092
§ 371 (c)(1),
(2) Date: Nov. 6, 2020

(87) PCT Pub. No.: WO2019/217404
PCT Pub. Date: Nov. 14, 2019

(65) Prior Publication Data
US 2021/0363050 A1  Nov. 25, 2021

Related U.S. Application Data

(60) Provisional application No. 62/667,878, filed on May 7, 2018.

(51) Int. Cl.
*C03B 33/09* (2006.01)
*B23K 26/00* (2014.01)
(Continued)

(52) U.S. Cl.
CPC ........ *C03B 33/091* (2013.01); *B23K 26/0006* (2013.01); *B23K 26/53* (2015.10); *C03B 33/0222* (2013.01); *B23K 2103/54* (2018.08)

(58) Field of Classification Search
CPC .............. C03B 33/091; C03B 33/0222; B23K 26/0006; B23K 26/53
See application file for complete search history.

(56) References Cited

U.S. PATENT DOCUMENTS

| | | | |
|---|---|---|---|
| 3,543,979 | A | 12/1970 | Grove et al. |
| 8,616,023 | B2 | 12/2013 | Grzybowski et al. |

(Continued)

FOREIGN PATENT DOCUMENTS

| | | |
|---|---|---|
| CN | 102060437 A | 5/2011 |
| CN | 104470866 A | 3/2015 |

(Continued)

OTHER PUBLICATIONS

KR 10-2017-0059395 A (Goto) May 30, 2017 (English language machine translation). [online] [retrieved Sep. 27, 2023]. Retrieved from: Clarivate Analytics. (Year: 2017).*

(Continued)

*Primary Examiner* — Erin Snelting
(74) *Attorney, Agent, or Firm* — Matthew J. Mason (57) ABSTRACT

A method of cutting a glass sheet comprising a transparent oxide glass includes directing a laser beam from a middle-infrared (mid-IR) laser source onto a major surface of the glass sheet. A wavelength of the laser beam is tuned thereby adjusting an absorption depth of the laser beam in the glass sheet. The glass sheet is cut using the laser beam.

19 Claims, 4 Drawing Sheets

(51) Int. Cl.
  *B23K 26/53* (2014.01)
  *C03B 33/02* (2006.01)
  *B23K 103/00* (2006.01)

(56) References Cited

U.S. PATENT DOCUMENTS

| | | |
|---|---|---|
| 8,946,590 B2 | 2/2015 | Li |
| 9,346,130 B2 | 5/2016 | Lei et al. |
| 9,515,286 B2 | 12/2016 | Dabich et al. |
| 9,815,730 B2 | 11/2017 | Marjanovic et al. |
| 9,850,160 B2 | 12/2017 | Marjanovic et al. |
| 2007/0039932 A1 | 2/2007 | Haase et al. |
| 2008/0290077 A1 | 11/2008 | Demeritt et al. |
| 2011/0127242 A1 | 6/2011 | Li |
| 2013/0126573 A1* | 5/2013 | Hosseini ............ B23K 26/0006 225/2 |
| 2013/0291598 A1* | 11/2013 | Saito ................ B23K 26/0736 65/112 |
| 2015/0089977 A1 | 4/2015 | Li |
| 2015/0114044 A1* | 4/2015 | Saito ...................... C03B 33/07 65/102 |
| 2015/0121962 A1 | 5/2015 | Jiang et al. |
| 2015/0132525 A1 | 5/2015 | Kato et al. |
| 2015/0183679 A1* | 7/2015 | Saito ...................... C03B 33/04 65/112 |
| 2017/0066679 A1* | 3/2017 | Yeh ......................... B32B 17/10 |
| 2017/0197868 A1 | 7/2017 | Gupta et al. |
| 2018/0057390 A1 | 3/2018 | Hackert et al. |
| 2018/0105451 A1 | 4/2018 | Wieland |
| 2020/0277225 A1 | 9/2020 | Logunov |

FOREIGN PATENT DOCUMENTS

| | | | |
|---|---|---|---|
| CN | 104487391 A | 4/2015 | |
| CN | 205085542 U | 3/2016 | |
| CN | 105750736 A | 7/2016 | |
| CN | 103079747 B | 8/2016 | |
| JP | 2011-011972 A | 1/2011 | |
| JP | 6090325 B2 | 3/2017 | |
| JP | 2018-008842 A | 1/2018 | |
| KR | 10-1521543 B1 | 5/2015 | |
| KR | 2017059395 A * | 5/2017 | ............... B28D 5/04 |
| TW | I483802 B | 5/2015 | |
| WO | 2016/154284 A1 | 9/2016 | |

OTHER PUBLICATIONS

International Search Report and Written Opinion of the International Searching Authority; PCT/US2019/031092; dated Aug. 22, 2019; 11 Pages; Korean Intellectual Property Office.
Chinese Patent Application No. 201980031093.5, Office Action, dated May 24, 2022, 4 pages, Chinese Patent Office.
Taiwanese Patent Application No. 108115373, Office Action, dated Apr. 13, 2023, 1 page; Taiwanese Patent Office.

* cited by examiner

LASER-INDUCED SEPARATION OF TRANSPARENT OXIDE GLASS

CROSS-REFERENCE TO RELATED APPLICATIONS

This application is a National Stage application under 35 U.S.C. § 371 of International Application No. PCT/US2019/031092, filed on May 7, 2019, which claims the benefit of priority under 35 U.S.C. § 119 of U.S. Provisional Application Ser. No. 62/667,878 filed on May 7, 2018, the contents of which are incorporated herein by reference in their entireties.

TECHNICAL FIELD

The present invention relates to laser cutting of glass and, in particular, methods and apparatuses for laser-induced separation of transparent oxide glass.

BACKGROUND

Cutting glass with lasers typically includes localized heating of the glass resulting in thermal stress in the glass. $CO_2$ and CO lasers are often used that have relatively high absorption in the glass material. In the infrared range, absorption in oxide glasses is relatively high; however, most of the radiation is absorbed only a few μm from the surface of the glass. As a result, the initial crack may be shallow and require additional processing for full separation of the glass segments.

The effect of localized heating of glass sheets may be achieved by tuning the laser wavelength to the absorption band of the particular glass material or by multi-photon absorption (e.g., two photon absorption), creating color centers, etc. Most oxide glasses used in practical applications need to be transparent in the visible wavelength range (400-750 nm), which significantly limits the range of laser wavelengths available for processing of glass.

What are needed are additional methods and apparatuses for laser-induced separation of transparent oxide glass.

SUMMARY

The present disclosure involves use of a middle infrared (mid-IR) laser to create a desired temperature profile on the glass surface and inside the thickness of the glass for a laser-induced glass separation process. The ability to tune the mid-IR laser wavelength to achieve a desired depth of penetration of laser radiation into the thickness of the glass provides flexibility in the separation process. Control of wavelength in the mid-IR range gives opportunity to change the depth of heating zone in the glass, for example, from about 30 μm to about 30 cm, depending on the thickness of the glass. This ability to control depth of the heating zone in the glass can allow for different heating profiles for different laser separation processes.

Availability of mid-IR lasers in the mid-IR wavelength range (2.5-3.0 μm) with powers of up to tens of Watts can increase opportunities for processing visibly transparent oxide glasses. This is due to most oxide glasses, with a few exceptions, having a strong absorption peak at 2.6-2.9 μm in the O—H fundamental absorption band. The O—H fundamental absorption band has a sharp absorption curve thereby allowing tuning transmission of the glass by selection of laser wavelength in a relatively narrow wavelength range.

According to a first aspect, a method of cutting a glass sheet comprising a transparent oxide glass, the method comprising: directing a laser beam from a middle-infrared (mid-IR) laser source onto a major surface of the glass sheet; tuning a wavelength of the laser beam so as to adjust an absorption depth of the laser beam in the glass sheet; and cutting the glass sheet using the laser beam According to a second aspect, there is provided the method of aspect 1, further comprising moving the laser beam along a predetermined cut path, the glass sheet being cut along the cut path during the step of cutting the glass sheet.

According to a third aspect, there is provided the method of aspect 1 or 2, wherein the step of tunung the wavelength of the laser beam comprises tuning the wavelength within the hydroxyl absorption band of the glass sheet.

According to a fourth aspect, there is provided the method of any one of the aspects above, wherein the step of tuning the wavelength of the laser beam comprises tuning the wavelength to between 2.6 μm and 2.9 μm.

According to a fifth aspect, there is provided the method of any one of the aspects above, wherein the step of cutting the glass sheet using the laser beam comprises separating the glass sheet into multiple glass sheets.

According to a sixth aspect, there is provided the method of any one of the aspects above, wherein the step of cutting the glass sheet using the laser beam comprises cutting only partially through a thickness of the glass sheet forming a crack.

According to a seventh aspect, there is provided the method of any one of the aspects above, further comprising arranging a transparent cover substrate on the major surface of the glass sheet, the cover substrate having a transmission percentage that is greater than a transmission percentage of the glass sheet in a mid-IR wavelength range; and directing the laser beam through the cover glass sheet.

According to an eighth aspect, there is provided the method of aspect 7, wherein the cover substrate has a mid-IR wavelength range transmission percentage of at least 80 percent.

According to a ninth aspect, there is provided the method of aspect 7 or 8, wherein the cover glass sheet comprises dry fused silica.

According to a tenth aspect, there is provided the method of any one of the aspects above, wherein the mid-IR laser source comprises a chromium doped ZnSe or ZnS laser.

According to an eleventh aspect, a method of cutting a glass sheet comprising a transparent oxide glass, the method comprising: arranging a cover glass sheet comprising a transparent cover substrate on a broad surface of the glass sheet, the cover substrate having a middle-infrared (Mid-IR) wavelength transmission percentage that is greater than a mid-IR wavelength range transmission percentage of the glass sheet; directing a laser beam from a mid-IR laser source through the cover glass sheet onto a major surface of the glass sheet; and cutting the glass sheet using the laser beam passing through the cover glass without cutting the cover glass.

According to a twelfth aspect, there is provided the method of aspect 11, further comprising moving the laser beam along a predetermined cut path, the glass sheet being cut along the cut path during the step of separating the glass sheet into multiple glass sheets.

According to a thirteenth aspect, there is provided the method of aspect 10 or 11, wherein the glass sheet is less than about 8 mm in thickness.

According to a fourteenth aspect, there is provided the method of any one of aspects 10-13, further comprising tuning a wavelength of the laser beam to between 2 μm and 3 μm so as to adjust an absorption depth of the laser beam in the glass sheet.

According to a fifteenth aspect, there is provided the method of aspect 14, wherein the step of tuning the wavelength of the laser beam comprises tuning the wavelength to between 2.6 μm and 2.9 μm.

According to a sixteenth aspect, there is provided the method of any one of aspects 10-15, wherein the step of cutting the glass sheet using the laser beam comprises separating the glass sheet into multiple glass sheets.

According to a seventeenth aspect, there is provided the method of any one of aspects 10-16, wherein the step of cutting the glass sheet using the laser beam comprises cutting only partially through a thickness of the glass sheet.

According to an eighteenth aspect, there is provided the method of any one of aspects 10-17, wherein the cover substrate has a mid-IR wavelength range transmission percentage of at least 80 percent.

According to a nineteenth aspect, there is provided the method of aspect 18, wherein the cover glass sheet comprises a mid-IR transparent material.

According to a twentieth aspect, there is provided the method of any one of aspects 10-19, wherein the mid-IR laser source comprises a chromium doped ZnSe or ZnS laser.

According to a twenty-first aspect, there is provided the method of any one of aspects 10-20, comprising tuning the wavelength of the laser beam within hydroxyl absorption band of the glass sheet.

Additional features and advantages will be set forth in the detailed description which follows, and in part will be readily apparent to those skilled in the art from the description or recognized by practicing the invention as exemplified in the written description and the appended drawings and as defined in the appended claims. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

The term "light" is broadly understood to mean any type of electromagnetic radiation, including but not limited to ultra-violet, near ultra-violet, infrared, near-infrared and mid-infrared.

The term "transparent," is used to refer to a solid material in which at least 80% (e.g., 90% or more, 95% or more, etc.) of the radiation in a particular wavelength range (e.g., visible spectrum, mid-IR spectrum, etc.) that penetrates the material is transmitted through the material as opposed to being absorbed or scattered by the material.

The term "oxide glass" refers to a glass network composed of oxygen polyhedra. Network former examples include $SiO_2$, $GeO_2$, $P_2O_5$ and $As_2O_5$.

Figure 1:
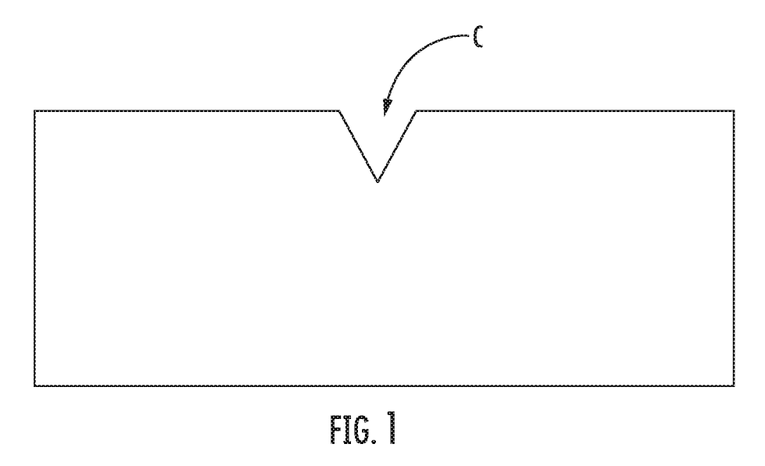
FIG. 1 is a schematic side view of a glass sheet having a cut line formed by a CO or $CO_2$ laser, according to one or more embodiments shown and described herein.

Currently, laser-induced cutting of transparent oxide glasses includes the use of $CO_2$ or CO laser glass surface heating (due to absorption in oxide glasses) combined with cooling or the use of near-IR or visible-range lasers combined with multipath or multi-pass approaches (due to the low absorption of transparent oxide glasses in the near-IR or visible laser wavelength ranges). For $CO_2$ and CO lasers, absorption occurs within 1-5 μm of the transparent oxide glass surface and the rest of the volume is heated by thermal conduction. To compensate for the shallow absorption depth of 1-5 μm, especially where cutting speed of the laser is high (e.g., about 1 m/s or more), an elongated beam may be generated to increase heat diffusion depth, followed by cooling of the heated region of the glass with water mist or gas. Even in the $CO_2$ or CO laser-induced cutting approaches, the resulting crack in the transparent oxide glass can be shallow, e.g., about 50-60 μm, and the rest of the glass may be still intact, as represented by FIG. 1. The separation may be further induced by bending the glass along a cut line C, which may lead to additional chips and debris, an imperfect surface cut and decreased resulting edge strength. Use of near-IR lasers may have an improved separation result. However, for low absorbing glass cases using a near-IR laser (between about 800 nm and 1600 nm), limitations include slow cutting speeds or high laser power to compensate for low absorption. In these cases, the process may result in separation of the glass sheet without bending or otherwise mechanically breaking, which may be referred to as "full body separation" using only the laser cutting process.

Embodiments described herein generally relate to processing of glass using a middle infrared (mid-IR) laser to create a desired temperature profile on the glass surface and inside the thickness of the glass for a laser-induced glass separation process. In particular, oxide glasses have some content of water and the fundamental vibration of the O—H bond of the oxide glass compositions lies in the 2.7 μm-2.9 μm wavelength range depending on glass composition. The mid-IR laser may be tunable in the 2 μm-3 μm range with output power reaching about 50 Watts or even more. By incrementally tuning the laser wavelength within 0.1 μm-1 μm around the absorption peak, one can change absorption in the glass material from low teens of percent to almost 100 percent in the glass thickness thereby enabling localized heating of the glass.

Figure 2A:
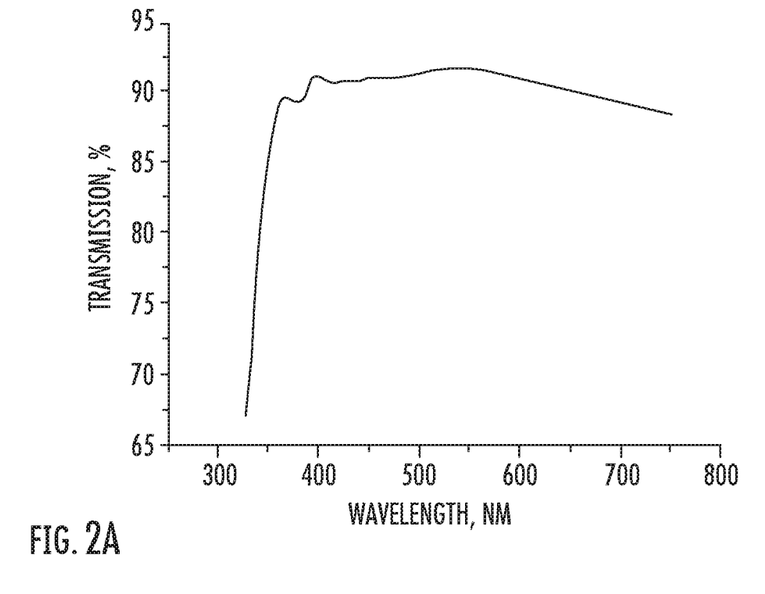
FIG. 2A illustrates a transmission spectrum for alkaline earth aluminosilicate glasses and sodium aluminosilicate glasses.
Figure 2B:
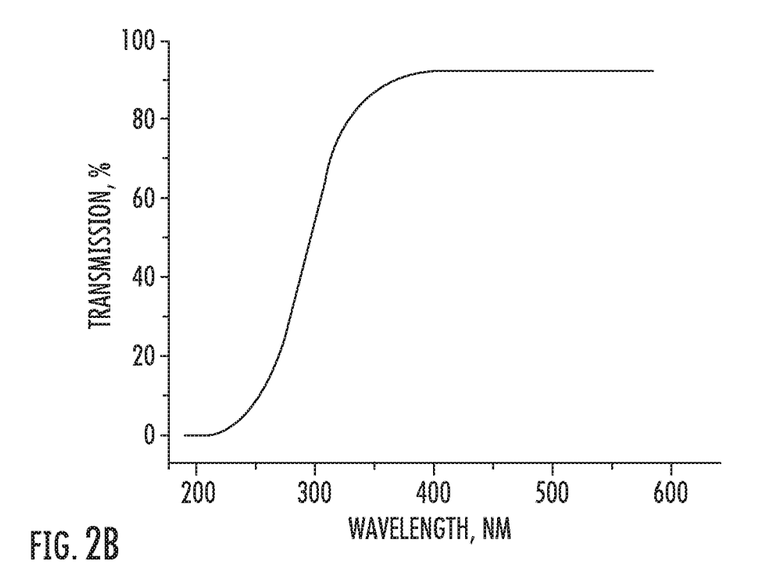
FIG. 2B illustrates a transmission spectrum for soda lime glass.

As indicated above, available transparent glasses have very little absorption at wavelengths where many high-power lasers are available, such as in the near-infrared (NIR) band between about 800 nm and 1600 nm, or in the visible band between approximately 400 nm and 800 nm (e.g., second harmonic Nd-based lasers), or in the UV band operating between about 340 nm and about 380 nm. For example, alkaline earth aluminosilicate glasses and sodium aluminosilicate glasses (e.g., glasses such as Eagle® glass, EagleXG™ glass, 1317 glass and Gorilla™ glass, available from Corning Incorporated) typically have a transmission spectrum as shown in FIG. 2A, and soda lime glass (e.g., window glass) typically has a transmission spectrum as shown in FIG. 2B. As evident from FIGS. 2A and 2B, the transmission of alkaline earth aluminosilicate and soda-lime glasses is more than about 85% at 355 nm (as provided, for example, by a 3rd harmonic Nd-based laser operating at 355 nm), which is insufficient for heating even small volumes of glass (using a UV laser) to temperatures close to a working point (about $10^4$ poise) unless lasers with several-hundred watts of available output power are used.

Figure 3:
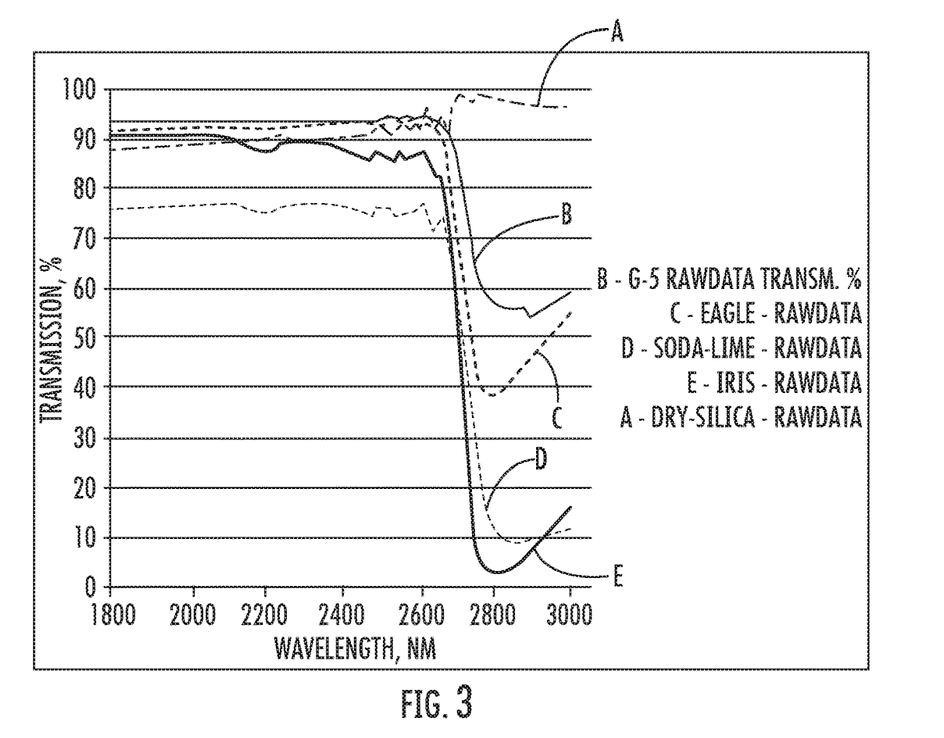
FIG. 3 illustrates transmission spectra for several glasses for the near-IR and mid-IR ranges.

The presence of water plays an important role in absorption characteristics of the transparent oxide glasses in the mid-IR wavelength range of the spectrum (2.5 μm-3.0 μm). This is because the fundamental vibration of the O—H bond lies in the 2.7 μm to 2.9 μm band. Referring to FIG. 3, for example, transmission spectra for several glasses are shown for the near-IR and mid-IR ranges. In the examples of FIG. 3, line A is dry silica glass, line B is Gorilla 5™ glass, line C is EagleXG™ glass, line D is soda-lime glass and line E is Iris™ glass, available from Corning Incorporated. The hydroxyl bands for the glasses have slightly different shapes and peak locations with sharp shoulders beginning at a wavelength of approximately 2.7 μm. In vitreous silica, there is a sharp OH absorption band beginning at 2.7 μm, as can be seen. In alkali silicates, this absorption band shifts to 2.9 μm. These sharp shoulders with rapid decreases in transmission percentages facilitate tuning of the mid-IR lasers within a relatively narrow wavelength range 0.1 μm to 1 μm around the absorption peak to achieve a large change in absorption and absorption depths of the water containing glasses. "Transmission percentage" refers to the percentage of incident light that is transmitted through the glass sheets instead of being reflected/scattered or absorbed.

Figure 4:
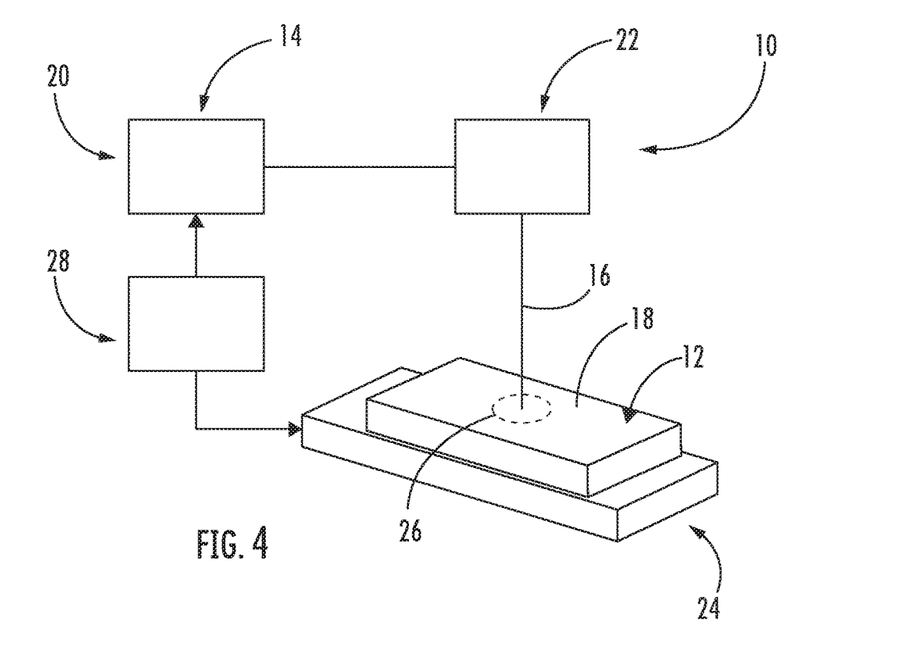
FIG. 4 schematically illustrates a glass processing apparatus utilizing a mid-IR laser for laser-separating a glass sheet, according to one or more embodiments shown and described herein.

Referring now to FIG. 4, an exemplary glass processing apparatus 10 utilizing a mid-IR laser is schematically illustrated for laser-separating a glass sheet 12 formed of an oxide glass. The glass processing apparatus 10 includes a processing light source 14 for producing a processing light beam 16. The processing light beam 16 is directed from source 14 to the glass sheet 12 having a major surface 18. The major surface 18 is the surface at which separation of the glass sheet 12 is initiated by directing the processing light beam 16 directly thereon. The glass sheet 12 is transparent. The processing light beam 16 may be directed to the glass sheet 12 by an optical system 20. In one embodiment, the processing light beam 16 produced by source 14 is a mid-IR laser that operates in the 2 μm-3 μm range. As one example, the mid-IR laser may be a high power CW tunable laser based on $CR^{2+}$:ZnSe and $CR^{2+}$:ZnS gain materials pumped by Er or Tm fiber lasers. Output power levels of the laser may be about 30 W to about 100 W.

In some embodiments, the optical system 20 may include a scanner 22 for directing beam 16 to selected areas of glass sheet 12. The scanner 22 can enable the writing of various patterns on the glass sheet major surface 18. Similar results may be achieved by fixing the position of the beam 16 and maneuvering the glass sheet 12 using motorized stages, as illustrated in FIG. 4. For example, a positioning mechanism 24, such as an X-Y stage, can be used to locate glass sheet 12 at a desired position relative to processing light beam 16. If desired, the positioning mechanism 24 may also include a Z-axis stage for controlling the size of beam spot 26. A suitable controller 28 may be provided for operating positioning mechanism 24 and, optionally, also processing light source 14.

Figure 5:
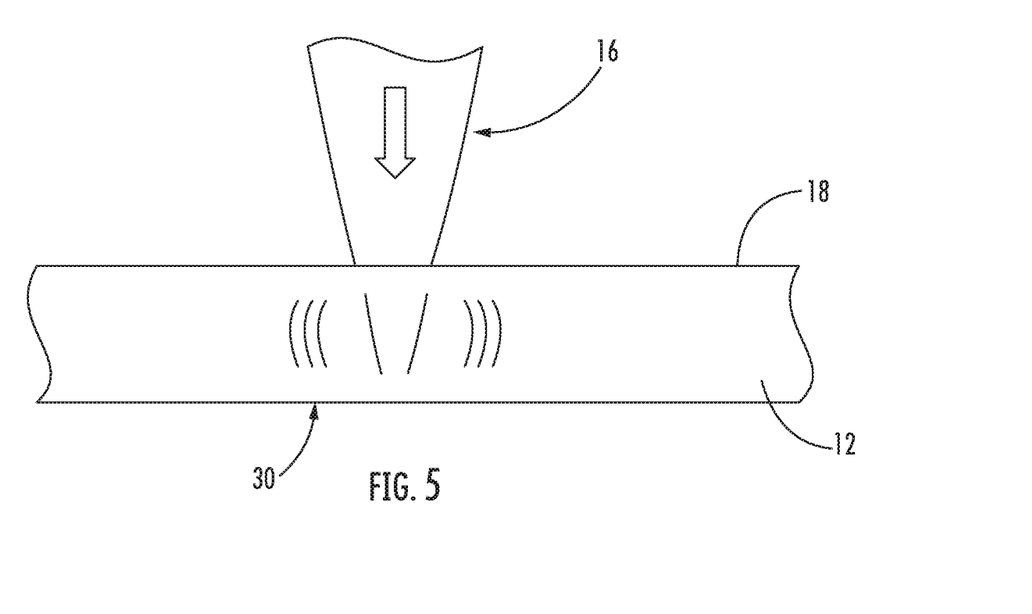
FIG. 5 schematically illustrates a laser-induced glass separation process, according to one or more embodiments shown and described herein.

Referring briefly to FIG. 5, the light beam 16 is illustrated being directed onto the major surface 18 of the glass sheet 12. A heated volume of the glass material is illustrated by element 30. Different heating profiles (depths and temperatures) can be achieved by varying laser wavelength, laser travel speed, etc.

Referring again to FIG. 3, some glasses, such as dry-silica glass having little to no water content and higher transmission percentage (e.g., at least about 30 percent, such as at least about 40 percent, such as at least about 50 percent, such as at least about 60 percent, such as at least about 70 percent, such as at least about 80 percent, such as at least about 90 percent) in the mid-IR wavelength range may be used as cover glass substrates during a laser-induced separation process. The dry cover glass has a higher transmittance in the mid-IR range than a wet glass sheet being cut (i.e., the workpiece glass sheet). The term "wet" refers to glasses having at least about 100 ppm OH groups, such as from about 100-1000 ppm OH groups in the glass network and "dry" refers to glasses having no greater than about 5 ppm OH groups in the glass network. For example, the cover glass sheet may be considered dry while the workpiece glass sheet being cut may be considered wet.

Figure 6:
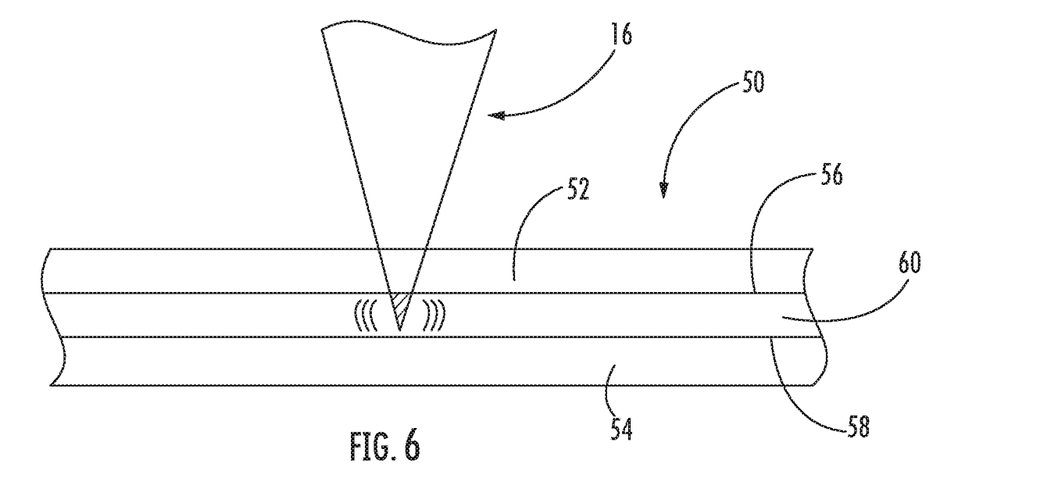
FIG. 6 schematically illustrates another laser-induced glass separation process using a cover substrate, according to one or more embodiments shown and described herein.

Referring to FIG. 6, a substrate stack 50 is illustrated that includes cover glass sheets 52 and 54 at opposite surfaces 56 and 58 of a workpiece glass sheet 60, thereby sandwiching the workpiece glass sheet 60 therebetween for a laser-induced separation operation. The cover glass sheets 52 and 54 may have a higher transmission percentage than the workpiece glass sheet 60 so that the processing light beam 16 passes through at least the cover glass sheet 12 that lies between the processing light source 14 and the workpiece glass sheet 60. The mid-IR laser wavelength may be tuned in the mid-IR wavelength range to achieve a predetermined absorption for a desired absorption depth into the workpiece glass sheet 60. After the processing light beam 16 is translated along a cutting path, full body separation may occur in the workpiece glass sheet 60 thereby forming multiple glass sheets. The cover glass sheets 52 and 54 being in contact with the workpiece glass sheet 60 can inhibit glass particles generated during cutting from precipitating onto the glass surfaces 56 and 58. While cover glass sheets 52 and 54 are shown, other suitable materials may include fluorinated or polyamide polymer films. The cover substrates can be placed on one or both surfaces 56 and 58 of the workpiece glass sheet 60. Additional cover glass examples may include Chalcogenide glasses, ZnSe, Ge or other mid-IR transparent material, mostly non-oxide based materials.

Embodiments described herein generally allow for laser-induced separation of transparent oxide glasses using mid-IR lasers. The mid-IR lasers may apply surface and/or volume heat treatment in a tunable fashion. The absorption (or penetration) depth of laser radiation can be precisely adjusted to a desired wavelength of between about 2.0 μm and about 3.0 μm, such as between about 2.6 μm and about 2.9 μm. The stress profile created by the mid-IR lasers in the transparent oxide glasses can be significantly different than profiles provided by other types of lasers, such as $CO_2$ lasers, nanosecond pulsed lasers, and ultrafast laser processing. The stress profile may also depend on the thickness of the glass sheet. The glass sheet may have any suitable thickness, such as greater or less than about 0.7 mm. Further, the glass sheet may be considered flexible and ultra-thin, such as no greater than about 0.3 mm, such as between about 50 μm and 0.3 mm. Mid-IR lasers can be less expensive than other laser types and non-laser processes due to pricing and efficient laser-matter interaction.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the following claims.

The invention claimed is:

1. A method of cutting a glass sheet comprising a transparent oxide glass, the method comprising:
    directing a laser beam from a middle-infrared (mid-IR) laser source onto a major surface of the glass sheet;
    tuning a wavelength of the laser beam so as to adjust an absorption depth of the laser beam in the glass sheet;
    cutting the glass sheet using the laser beam; and
    arranging a transparent cover substrate on the major surface of the glass sheet, the cover substrate having a transmission percentage that is greater than a transmission percentage of the glass sheet in a mid-IR wavelength range; and
    directing the laser beam through the cover substrate.

2. The method of claim 1 further comprising moving the laser beam along a predetermined cut path, the glass sheet being cut along the cut path during the step of cutting the glass sheet.

3. The method of claim 1, wherein the step of tuning the wavelength of the laser beam comprises tuning the wavelength to between 2.6 μm and 2.9 μm.

4. The method of claim 1, wherein the step of tuning the wavelength of the laser beam comprises tuning the wavelength within hydroxyl absorption band of the glass sheet.

5. The method of claim 1, wherein the step of cutting the glass sheet using the laser beam comprises separating the glass sheet into multiple glass sheets.

6. The method of claim 1, wherein the step of cutting the glass sheet using the laser beam comprises cutting only partially through a thickness of the glass sheet.

7. The method of claim 1, wherein the cover substrate has a mid-IR wavelength range transmission percentage of at least 80 percent.

8. The method of claim 7, wherein the cover substrate comprises a mid-IR transparent material.

9. The method of claim 1, wherein the mid-IR laser source comprises a chromium doped ZnSe or ZnS laser.

10. A method of cutting a glass sheet comprising a transparent oxide glass, the method comprising:
    arranging a cover glass sheet comprising a transparent cover substrate on a broad surface of the glass sheet, the cover substrate having a middle-infrared (Mid-IR) wavelength transmission percentage that is greater than a mid-IR wavelength range transmission percentage of the glass sheet;
    directing a laser beam from a mid-IR laser source through the cover glass sheet onto a major surface of the glass sheet; and
    cutting the glass sheet using the laser beam passing through the cover glass sheet without cutting the cover glass sheet.

11. The method of claim 10 further comprising moving the laser beam along a predetermined cut path, the glass sheet being cut along the cut path during the step of separating the glass sheet into multiple glass sheets.

12. The method of claim 10, further comprising tuning a wavelength of the laser beam to between 2 μm and 3 μm so as to adjust an absorption depth of the laser beam in the glass sheet.

13. The method of claim 12, wherein the step of tuning the wavelength of the laser beam comprises tuning the wavelength to between 2.6 μm and 2.9 μm.

14. The method of claim 12, wherein the step of tuning the wavelength of the laser beam comprises tuning the wavelength within hydroxyl absorption band of the glass sheet.

15. The method of claim 10, wherein the step of cutting the glass sheet using the laser beam comprises separating the glass sheet into multiple glass sheets.

16. The method of claim 10, wherein the step of cutting the glass sheet using the laser beam comprises cutting only partially through a thickness of the glass sheet forming a crack.

17. The method of claim 10, wherein the cover substrate has a transmission percentage of at least 80 percent in the mid-IR wavelength range.

18. The method of claim 17, wherein the cover glass sheet comprises a mid-IR transparent material.

19. The method of claim 10, wherein the mid-IR laser source comprises a chromium doped ZnSe or ZnS laser.

* * * * *